(12) United States Patent
Yokoyama et al.

(10) Patent No.: US 8,304,027 B2
(45) Date of Patent: Nov. 6, 2012

(54) BAR COATER, AND BAR COATING METHOD

(75) Inventors: Hiroki Yokoyama, Minami-Ashigara (JP); Toshiya Mita, Minami-Ashigara (JP); Nobuo Hamamoto, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 303 days.

(21) Appl. No.: 12/721,787

(22) Filed: Mar. 11, 2010

(65) Prior Publication Data

US 2010/0233381 A1    Sep. 16, 2010

(30) Foreign Application Priority Data

Mar. 13, 2009    (JP) .................. 2009-061677

(51) Int. Cl.
*B05D 5/00*    (2006.01)
*B05D 7/00*    (2006.01)
(52) U.S. Cl. ......... 427/428.18; 427/428.01; 427/428.13; 427/428.2
(58) Field of Classification Search ............ 427/428.01, 427/428.13, 428.18, 428.2; 118/410, 411, 118/412, 419
See application file for complete search history.

(56) References Cited

U.S. PATENT DOCUMENTS

| | | |
|---|---|---|
| 6,780,470 B2 | 8/2004 | Ishizuka et al. |
| 7,074,458 B2 | 7/2006 | Ishizuka et al. |

FOREIGN PATENT DOCUMENTS

| | | |
|---|---|---|
| JP | 7-189196 A | 7/1995 |
| JP | 7-246358 A | 9/1995 |
| JP | 9-201563 A | 8/1997 |
| JP | 9-294956 A | 11/1997 |
| JP | 2003-033702 A | 2/2003 |
| JP | 2006-082059 A | 3/2006 |

*Primary Examiner* — Nathan Empie
(74) *Attorney, Agent, or Firm* — Buchanan & Ingersoll & Rooney PC

(57) ABSTRACT

A bar coater includes: a bar for applying a coating liquid to a web; a support member which is arranged on a lower side of the bar so as to rotatably support the bar; a weir arranged at an upstream side of the bar, the weir having a leading end surface at its distal end portion to form a bead of the coating liquid in a space between the leading end surface and the web; a reservoir including the bar, the support member and the weir, the reservoir for accumulating the coating liquid; a pump for supplying the coating liquid to the reservoir; a liquid discharge passage through which the coating liquid excessively supplied to the reservoir is discharged; and a controlling device for controlling the pump so as not to cause distortion of a dynamic contact line which is formed at interface between the coating liquid and the atmosphere.

4 Claims, 5 Drawing Sheets

BAR COATER, AND BAR COATING METHOD

BACKGROUND OF THE INVENTION

1. Field of the Invention

The present invention relates to a bar coater, and a bar coating method. More specifically, the presently disclosed subject matter relates to a coating technique for producing an optical film having suitable quality for use in liquid crystal display devices.

2. Description of the Related Art

In a coating process involving the production of an optically functional film such as an optical compensation film, it is required to dispense a coating liquid uniformly to form a thin layer. Such thin layer coating, however, often causes longitudinal stripes and streak defects. Therefore, various measures have been conventionally studied and taken to prevent such defects.

For example, in order to suppress the occurrence of an irregular vortex in a reservoir located at the primary side (the upstream side of a web traveling direction) of a coater, there has been proposed to use the length of 10 mm to 50 mm for the reservoir in the web traveling direction (Japanese Patent Application Laid-Open No. 2003-33702).

In bar coaters, it is proposed to prevent stepped nonuniformity of coating due to vibration of a bar, and coating streak defects due to a vortex generated between the bar and a bar support member, by defining a relationship between a maximum radius of a cross section of the bar and a curvature radius of a circular arc in cross section of a bar receiver, a bar-holding angle, and the like (Japanese Patent Application Laid-Open No. 2006-82059).

There has been also proposed a bar coating method in which a wrap angle of the web with respect to the bar is set from 2.5° to 30°; a ratio of Rb/Rh is maintained in the range of from 0.9 to 1.0, where Rb designates a maximum radius of the bar cross-section, and Rh designates a curvature radius of a circular arc in cross section of a bar receiver serving as a bar support member; and a bar-holding angle of the bar support member is set to be 90° or more and 180° or less (Japanese Patent Application Laid-Open No. 9-201563).

Various methods proposed include a method in which a shearing force is applied to a coating liquid before it squirts out of a fountain nozzle in a blade coater, so as to reduce the viscosity of the coating liquid (Japanese Patent Application Laid-Open No. 7-189196), and a method of providing on a rod-bar holder a foreign matter-removing brush for removing foreign matter and aggregates caught in a gap between rod wires (Japanese Patent Application Laid-Open No. 7-246358). Also, in a coating method, in which after a coating film is formed on a substrate, and excess liquid is scraped off by a scraping roller to obtain a necessary film thickness, in order to prevent coating defects caused by dryness of the surface of the scraping roller, a method is proposed to supply a surface of the scraping roller with a coating liquid or solvent (Japanese Patent Application Laid-Open No. 9-294956).

SUMMARY OF THE INVENTION

In the meanwhile, as shown in FIG. 1, in a bar coater 1 according to Japanese Patent Application Laid-Open No. 2003-33702, at the upper side of a weir 2, an excessive amount of a coating liquid supplied to a reservoir 3 flows over the weir 2. At the same time, a bead 5 is formed between a leading end surface 2A of the weir 2 and a web 4. In this state, the direction of a flow of coating liquid accompanied by the web 4 is opposite to the direction of the flow of the coating liquid flowing over the leading end surface (tip surface) 2A of the weir 2. For this reason, a dynamic contact line 6 or a dynamic contact line 6' forming the bead 5 may be distorted. This distortion of the dynamic contact line 6 or dynamic contact line 6' has conventionally caused coating streaks. Note that the dynamic contact line 6 indicates a dynamic contact line formed when the supply amount of the coating liquid is 5 [kg/min], and the dynamic contact line 6' indicates a dynamic contact line formed when the supply amount of the coating liquid is 12 [kg/min].

The presently disclosed subject matter has been made in light of the above-mentioned circumstances. An object of the present invention is to provide a bar coater, and a bar coating method, capable of reducing the occurrence of coating streaks due to distortion of a dynamic contact line.

To achieve the above object, a bar coater according to a first aspect of the presently disclosed subject matter includes: a bar for applying a coating liquid to a traveling web; a support member which is arranged on a lower side of the bar so as to rotatably support the bar; a weir arranged at an upstream side of the bar, the weir having a leading end surface at its distal end portion to form a bead of the coating liquid in a space between the leading end surface and the web; a reservoir including the bar, the support member and the weir, the reservoir for accumulating the coating liquid; a supply passage through which the coating liquid is supplied to the reservoir; a pump for supplying the coating liquid to the reservoir; a liquid discharge passage through which the coating liquid excessively supplied to the reservoir is discharged; and a controlling device for controlling the pump so that an amount of the coating liquid supplied to the reservoir satisfies the following expressions (1) to (4), $$0 \leq \Delta P1 - \rho g H \leq \Delta P2 \qquad (1)$$

$$\Delta P1 = 12 \eta q L / \delta u^3 \qquad (2)$$

$$\Delta P2 = (6 \eta U/a) \times (1/(h_0 - aX_b) - 1/h_0) \qquad (3)$$

$$q = Q/(60 \times \rho \times W) \qquad (4)$$

where $\eta$ designates a viscosity [Pa·s] of the coating liquid, q designates a flow rate per unit width [m²/s] of the coating liquid flowing through the liquid discharge passage, Q designates a supply amount [kg/min] of the coating liquid, $\rho$ designates a density [kg/m³] of the coating liquid, L designates a length [m] of the liquid discharge passage, U designates a traveling speed [m/s] of the web, "a" designates a gradient (=tan θ) of the leading end surface of the weir, h0 designates a clearance [m] between a start point of the leading end surface of the weir and the web, $X_b$ designates a length [m] of the bead, H designates a height [m] of the weir from the liquid discharge passage to a start point of the leading end surface, W designates a width [m] of the liquid discharge passage, δu designates a clearance [m] of the liquid discharge passage, and "g" designates a gravitational acceleration [m/s²].

In a bar coater equipped with a weir constituting a reservoir and a liquid discharge passage, a coating liquid supplied in an excessive amount is discharged outward through the liquid discharge passage without flowing over the weir by controlling the supply amount of the coating liquid so as to satisfy the expressions (1) to (4) described above. With this, it is possible to prevent a dynamic contact line of the coating liquid from being distorted and to reliably form a bead of the coating liquid in a space between the leading end surface of the weir and a web.

In the bar coater according to the first aspect of the presently disclosed subject matter, the clearance of the liquid discharge passage is preferably in the range of from $0.1 \times 10^{-3}$ to $10 \times 10^{-3}$ [m].

In the bar coater according to the first aspect of the presently disclosed subject matter, the horizontal length of the leading end surface of the weir is preferably in the range of from $1 \times 10^{-3}$ to $10 \times 10^{-3}$ [m], and the gradient of the leading end surface of the weir is preferably in the range of from $\frac{1}{30}$ to 5.

In the bar coater according to the first aspect of the presently disclosed subject matter, the height of the weir from the liquid discharge passage to the start point of the leading end surface is preferably in the range of from $5 \times 10^{-3}$ to $50 \times 10^{-3}$ [m].

To achieve the object described above, a bar coating method according to a second aspect of the presently disclosed subject matter, the bar coating method for applying a coating liquid to a traveling web, includes the steps of: applying a coating liquid in a reservoir onto a traveling web by rotating a bar; forming a bead of the coating liquid in a space between the web and a leading end surface provided at a distal end portion of a weir which is arranged at the upstream side of the bar; and supplying the coating liquid to the reservoir and discharging the coating liquid excessively supplied to the reservoir through a liquid discharge passage, wherein an amount of the coating liquid supplied to the reservoir satisfies the following expressions (1) to (4), $$0 \leq \Delta P1 - \rho g H \leq \Delta P2 \quad (1)$$

$$\Delta P1 = 12 \eta q L / \delta u^3 \quad (2)$$

$$\Delta P2 = (6 \eta U/a) \times (1/h_0 - aX_b) - 1/h_0) \quad (3)$$

$$q = Q/(60 \times \rho \times W) \quad (4)$$

(where $\eta$ designates a viscosity [Pa·s] of the coating liquid, q designates a flow rate per unit width [m²/s] of the coating liquid flowing through the liquid discharge passage, Q designates a supply amount [kg/min] of the coating liquid, $\rho$ designates a density [kg/m³] of the coating liquid, L designates a length [m] of the liquid discharge passage, U designates a traveling speed [m/s] of the web, "a" designates a gradient (=tan θ) of the leading end surface of the weir, h0 designates a clearance [m] between a start point of the leading end surface of the weir and the web, $X_b$ designates a length [m] of the bead, H designates a height [m] of the weir from the liquid discharge passage to the start point of the leading end surface, W designates a width [m] of the liquid discharge passage, δu designates a clearance [m] of the liquid discharge passage, and g designates a gravitational acceleration [m/s²]).

In the bar coating method according to the second aspect of the presently disclosed subject matter, the clearance of the liquid discharge passage is preferably in the range of from $0.1 \times 10^{-3}$ to $10 \times 10^{-3}$ [m].

In the bar coating method according to the second aspect of the presently disclosed subject matter, the horizontal length of the leading end surface of the weir is preferably in the range of from $1 \times 10^{-3}$ to $30 \times 10^{-3}$ [m], and the gradient of the leading end surface of the weir is preferably in the range of from $\frac{1}{30}$ to 5.

In the bar coating method according to the second aspect of the presently disclosed subject matter, the height of the weir from the liquid discharge passage to the start point of the leading end surface is preferably in the range of from $5 \times 10^{-3}$ to $50 \times 10^{-3}$ [m].

According to the presently disclosed subject matter, it is possible to prevent a dynamic contact line from being distorted and to reduce the occurrence of coating streaks.

DETAILED DESCRIPTION OF THE PREFERRED EMBODIMENTS

Hereinafter, preferred embodiments of the present invention will be described with reference to the drawings attached hereto. The present invention will be described in accordance with the following preferred embodiments; however, modifications may be made using various means without departing from the spirit and scope of the presently disclosed subject matter. Embodiments other than those explained in the present embodiments can be used. Accordingly, all modifications within the present invention are included within the spirit and scope of the appended claims. Also, it should be noted that in the description of the present invention, the numerical range explained by means of "in the range of from-to" or "to" means a range including numerical values before and after the numerical values described.

Figure 1:
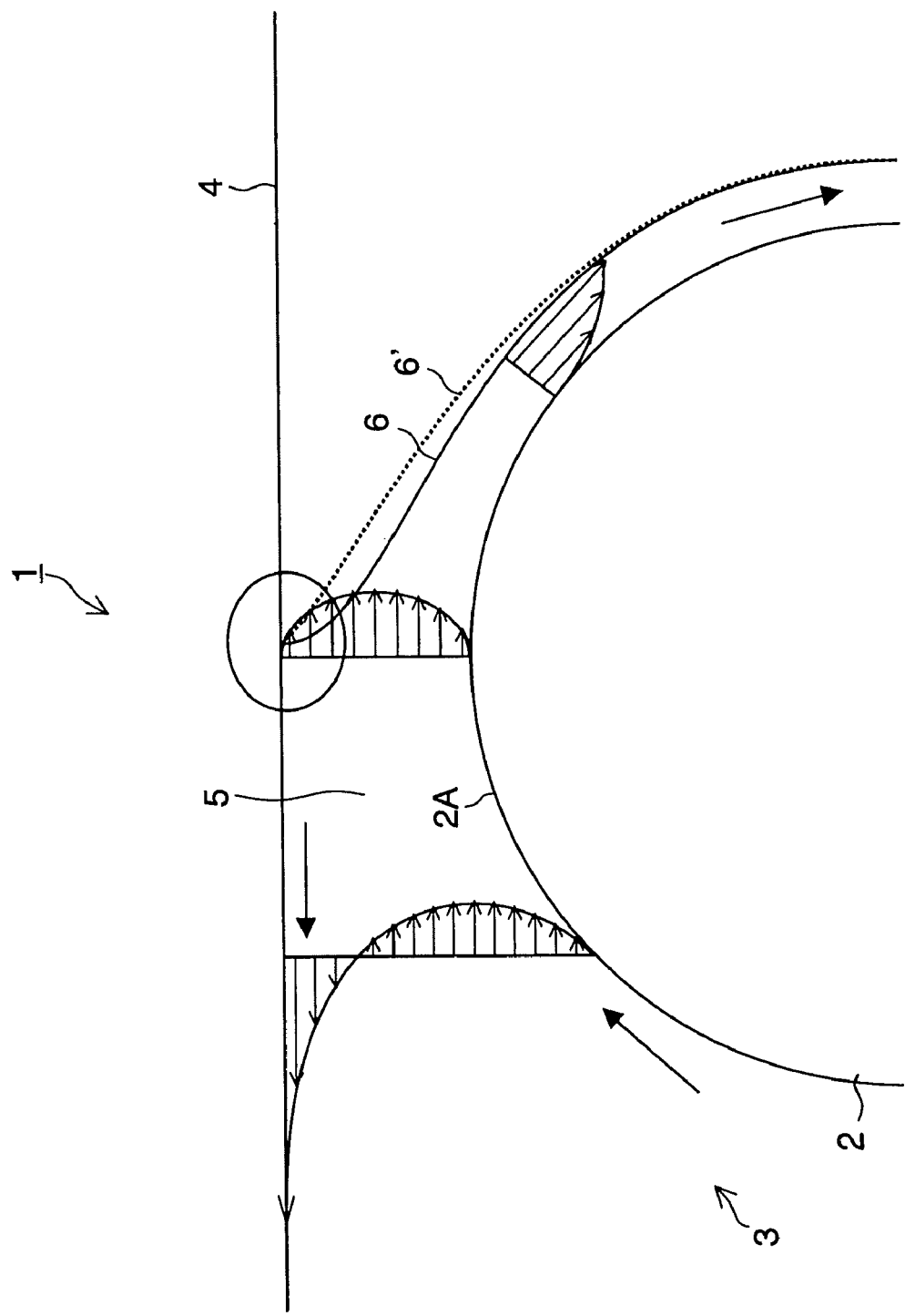
FIG. 1 is a partially enlarged diagram of a conventional bar coater.
Figure 2A:
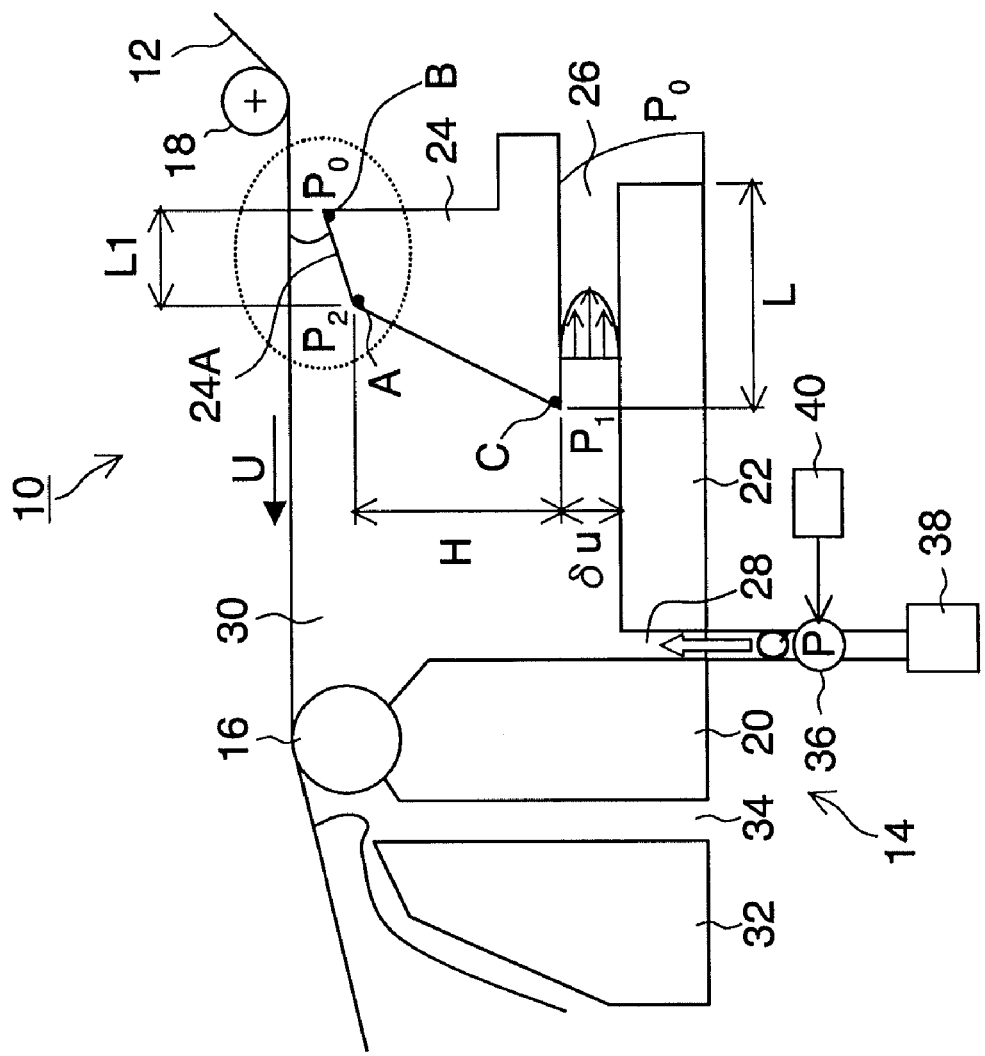
FIGS. 2A and 2B are schematic diagrams of a bar coater according to one embodiment of the present invention.
Figure 2B:
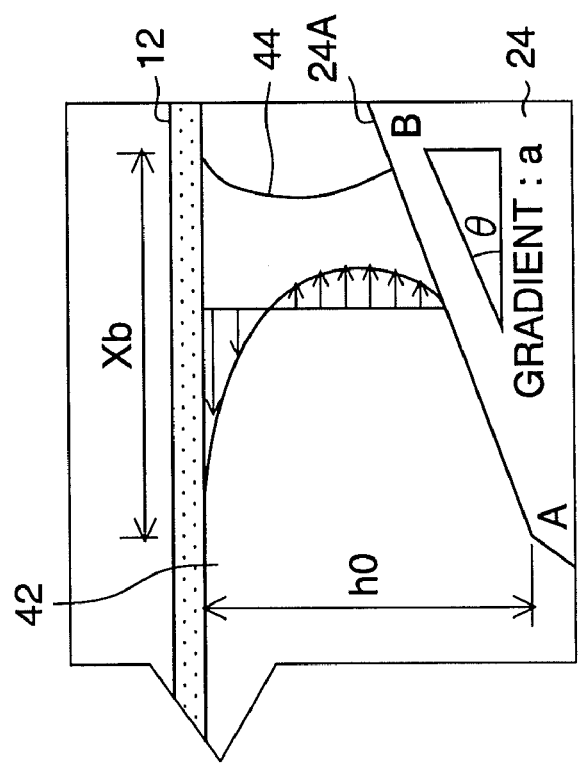

FIGS. 2A and 2B are cross-sectional diagrams schematically showing a configuration of a bar coater according to one embodiment to which the present invention is applied. FIG. 2A is a cross-sectional diagram of the overall appearance of a bar coater 10; and FIG. 2B is a partially enlarged diagram showing a leading end surface and a web.

The bar coater 10 is a device which applies a coating liquid to a web (strip-shaped support) 12 continuously traveling along the traveling direction, and is equipped with a coating head 14 having a bar 16, and a backup roller 18 which supports the web 12 from a surface side of the web 12 opposite to a surface to which the coating liquid is to be applied, so that the bar 16 makes contact with the web 12.

The bar 16 in the coating head 14 is formed into a cylindrical shape, which may have grooves formed at regular intervals in a circumferential direction, may have a wire closely wound on a surface thereof, or may have a smooth surface. Further, the bar 16 is connected to a rotation driving device (not shown) so as to be driven to rotate in the same direction as the traveling direction of the web 12 at a speed substantially same as the traveling speed of the web 12.

The bar 16 may be configured to rotate in a direction opposite to the traveling direction of the web 12, and further, may be configured to rotate at a different circumferential speed from the traveling speed of the web 12.

The bar 16 is supported by a support member 20. At an upper part of the support member 20, a circular arc groove is formed, and this groove rotatably supports the bar 16.

At the upstream side of the traveling direction of the web 12 to the bar 16 (i.e., on the side the web 12 enters), a first block 22 is disposed in parallel with the support member 20 at a predetermined interval therefrom. A slit 28 is formed by the first block 22 and the support member 20. Above the first block 22, a weir 24 is provided at the upstream side of the traveling direction of the web 12, and thereby the support member 20, the bar 16, the first block 22 and the weir 24 constitute a reservoir 30.

The slit 28 is connected to a coating liquid tank 38 via a pump 36. The pump 36 is driven by a controlling device 40, and thereby the coating liquid in the coating liquid tank 38 is supplied to the reservoir 30 through the slit 28. The coating liquid stored in the reservoir 30 is scooped up (spooled up) by the rotating bar 16 and wrapped around on the outer surface of the bar 16 so as to be applied onto the web 12 travelling continuously.

As shown in FIGS. 2A and 2B, the weir 24 is provided with, for example, on its distal end portion, a leading end surface 24A having an inclined surface which is high in height on its upstream side and low in height on its downstream side. A bead 42 of the coating liquid is formed in a space between the leading end surface 24A and the web 12. At an interface between the coating liquid and the atmosphere, a dynamic contact line 44 forming the bead 44 is formed.

The bar coater 10 is provided with a liquid discharge passage 26 which includes the weir 24 and the first block 22. From the liquid discharge passage 26, the coating liquid supplied to the reservoir 30 in an excessive amount is discharged outward. The discharged coating liquid is collected by a liquid collection unit (not shown).

The weir 24 and the first block 22 may be separate bodies, and the liquid discharge passage 26 may be formed by the bodies. Also, the weir 24 and the first block 22 may be formed in one integral unit, and a through-hole may be formed in the one integral unit to form the liquid discharge passage 26.

In the present embodiment, the pump 36 is controlled by the controlling device 40 so that the coating liquid supplied in an excess amount is discharged outward from the liquid discharge passage 26 without overflowing onto the weir 24. Thus, the amount of the coating liquid supplied to the reservoir 30 is controlled, and it is possible to reduce distortion of the dynamic contact line 44 of the coating liquid and to prevent the occurrence of coating streaks. Note that the controlling operation by the controlling device 40 will be described below.

At the downstream side of the traveling direction of the web 12 to the bar 16, a second block 32 is disposed in parallel with the support member 20 at a predetermined interval therefrom. A slit 34 is formed by the second block 32 and the support member 20. To the slit 34, a supply line (not shown) for supplying the coating liquid is connected. In order to prevent the occurrence of coating defects due to dryness of a surface of the bar 16, the coating liquid supplied from the supply line will be supplied to the downstream side of the bar 16. With this, a coating liquid bead is formed in a space between the second block 32 and the surface of the bar 16. Part of the coating liquid supplied flows, as a coating liquid residue, over the second block 32 and flows down over an inclined surface of the second block 32.

Next, the method for controlling the supply amount of a coating liquid according to the present embodiment will be described with reference to FIGS. 2A and 2B. In the coater of the present embodiment, at the edge of the dam, in order to form a gas-liquid interface in a space between the leading end surface of the weir in the reservoir and a web and to prevent the distortion of a dynamic contact line, it is necessary to satisfy the following two conditions: (1) a coating liquid in the reservoir 30 be allowed to come up to the height of the start point A of the leading end surface 24A of the weir 24 to be sandwiched between the leading end surface 24A and the web; and (2) the coating liquid in the reservoir 30 does not flow over the end point B of the leading end surface 24A of the weir 24.

At the time of determining the supply amount of the coating liquid, firstly, it is required to calculate a value $\Delta P$ which is a difference between a value P2 of a pressure of the coating liquid at the start point A of the leading end surface 24A of the weir 24 and a value P0 of an atmospheric pressure. This can be represented by the following equations. This value $\Delta P$ means a pressure loss [Pa] received by the coating liquid in a space sandwiched by the leading end surface 24A of the weir 24 and the web.

$$\Delta P = P2 - P0 \quad (a)$$

Further, the equation (a) can be modified as follows.

$$\Delta P = (P2 - P1) + (P1 - P0) \quad (b)$$

where a value (P2−P1) is a difference between a pressure P1 at the inlet of the liquid discharge passage and a pressure P2 at the start point of the leading end surface, and means a potential [Pa] possessed by the coating liquid at the leading end surface 24A of the weir 24 in the reservoir 30 and in the liquid discharge passage 26. Accordingly, assuming that a density of the coating liquid is represented by $\rho$ [kg/m$^3$], a height of the weir 24 from the liquid discharge passage 26 (that is, from the point C in FIG. 2A) to the start point A of the leading end surface 24A is represented by H [m] and a gravitational acceleration is represented by g [m/s$^2$], the value (P2−P1) is represented by the following equation.

$$(P2 - P1) = -\rho g H \quad (c)$$

where since P1 designates a pressure possessed by the coating liquid at the inlet of the liquid discharge passage, and P0 designates an atmospheric pressure, a value of (P1−P0) designates a pressure loss [Pa] of the coating liquid when the coating liquid passes through the liquid discharge passage. From the viscosity of the coating liquid $\eta$[Pa·s], the flow rate per unit width q[m$^2$/s], the length of the liquid discharge passage L[m] and the clearance of the liquid discharge passage $\delta u$[m], the value $\Delta P1$ (=P1−P0) is calculated using the equation to determine a pressure loss received by a fluid sandwiched in flat plates disposed in parallel with each other.

$$\Delta P1 = 12 \eta q L / \delta u^3 \quad (d)$$

Assuming that the supply amount of the coating liquid is represented by Q[kg/min] and the density of the coating liquid is represented by $\rho$[kg/m$^3$], a flow rate per unit width q [m$^2$/s] of the coating liquid flowing through the liquid discharge passage having a width W[m] per second is calculated by the following equation.

$$q = Q / (60 \times \rho \times W) \quad (e)$$

Therefore, a pressure loss $\Delta P$ received by the coating liquid sandwiched between the leading end surface of the weir and the web is calculated by the following equation.

$$\Delta P = P2 - P0 = (P2 - P1) + (P1 - P0) = 12 \eta q L / \delta u^3 - \rho g H \quad (f)$$

Meanwhile, the pressure loss of the coating liquid which is filled between the web and the leading end surface of the weir, on the leading end surface of the weir, can be determined by directly calculating a pressure received by the coating liquid sandwiched between the lending end surface of the weir and the web.

The leading end surface of the weir may be sometimes tilted with respect to a horizontal direction of the web; however, in an interval of a minute distance $\Delta x$ along the horizontal direction, a surface of the web and the leading end surface are regarded as parallel flat plates, and thus if it is assumed that a pressure loss of the coating liquid filled between the leading end surface of the weir and the web is represented by ΔP [Pa], a viscosity of the coating liquid is represented by η[Pa·], a flow rate per unit width of the coating liquid is represented by q [m²/s], a minute distance in a horizontal direction between the leading end surface of the weir in the reservoir and the liquid discharge passage is represented by Δx [m], a clearance between the web and the leading end surface at a position x from the start point of the leading end surface of the weir in a horizontal direction thereto is represented by y(x) [m], and a given distance from the start point of the leading end surface of the weir in a horizontal direction thereto is represented by x [m], the coating liquid filled between the leading end surface of the weir and the web undergoes a pressure loss represented by the following equation.

$$\Delta P = 12\eta q \Delta x / y(x)^3 \quad (g)$$

In the coating liquid filled between the leading end surface of the weir and the web, on the leading end surface of the weir, there are a flow rate distribution of the coating liquid accompanied by the web and a flow rate distribution of the coating liquid pushing out the coating liquid by the liquid pressure inside the coating liquid, and if it is assumed that the traveling speed of the web is U [m/s], the flow rate per unit width is represented by the following equation.

$$q = (1/2) \times U y(x) \quad (h)$$

Accordingly, when the equation (h) is substituted into the equation (g), the following equation is established.

$$\Delta P = 12\eta q \Delta x / y(x)^3 = 12\eta \Delta x / y(x)^3 \times (1/2) \times U y(x) = 6\eta \Delta x / y(x)^2 \quad (i)$$

The pressure loss received by the coating liquid filled between the leading end surface of the weir and the web, on the leading end surface of the weir, is represented by a value which is obtained by integrating Δx in the above equation in a horizontal direction. As a result, the coating liquid undergoes a pressure loss represented by the following equation.

$$\Delta P_2 = \int_0^{Xb} \frac{6\eta U \Delta x}{y^2(x)} dx \quad (j)$$

Since a variable to be integrated is y, the pressure loss is calculated using integration by substitution.

$$y(x) = -ax + h_0 \quad (k)$$

When both sides of the above equation are differentiated, the following equations are established.

$$dy = -a \times dx \quad (l)$$

$$dx = (-1/a) \times dy \quad (m)$$

Note that when x is equal to 0, y(x) is equal to $h_0$, and when x is equal to $X_b$, y(x) is equal to $-aX_b + h_0$, the equation (j) is integrated by substitution as shown in the equation (n), and the pressure loss can be calculated.

[Mathematical Formula 1]

$$\Delta P_2 = \int_0^{Xb} \frac{6\eta U \Delta x}{y^2(x)} dx \quad (n)$$

$$= \int_{h0}^{-aXb+h0} \frac{6\eta U}{y^2} \times \left(-\frac{1}{a}\right) dy$$

$$= \frac{6\eta U}{a} \int_{h0}^{-aXb+h0} \left(-\frac{1}{y^2}\right) dy$$

$$= \frac{6\eta U}{a} \times \left[\frac{1}{y}\right]_{h0}^{-aXb+h0}$$

$$= \frac{6\eta U}{a} \times \left[\frac{1}{(h0 - aXb)} - \frac{1}{h0}\right]$$

In the present embodiment, it is required that (1) the coating liquid in the reservoir be allowed to come up to the height of the start point of the leading end surface of the weir to be sandwiched between the leading end surface and the web. When the pressure loss ΔP determined by the equation (f) is less than 0, the coating liquid will not come up to the height of the leading end surface of the weir, resulting in impossibility of forming a bead, because the resistance in the liquid discharge passage is small relative to a potential created when the coating liquid comes up to the height of the leading end surface from the bottom face of the reservoir. Therefore, a condition which will satisfy the inequality described below is required.

$$12\eta q L / \delta u^3 (= \Delta P1) - \rho g H \geq 0 \quad (o)$$

In addition, in the present invention, it is required that (2) the coating liquid in the reservoir does not flow over the end point of the leading end surface of the weir. The value ΔP determined by the equation (f) is equivalent to the value ΔP2 determined by the equation (n). In the equation (n), ΔP2 is a function of $X_b$, and $X_b$ is a horizontal distance (bead length) of a space which is filled with the coating liquid between the web and the leading end surface of the weir, from the start point of the leading end surface of the weir.

If the bead length $X_b$ is larger than the horizontal distance of the leading end surface of the weir, it means that the coating liquid flows over from the outlet of the leading end surface of the weir. Therefore, in order for the coating liquid not to flow over from the outlet of the leading end surface of the weir, the bead length $X_b$ must be equal to or smaller than the horizontal distance (L1) of the leading end surface of the weir. Accordingly, there is a need to satisfy the following equation.

$$12\eta q L / \delta u^3 (=\Delta P1) - \rho g H \leq (6\eta U/a) \times (1/(h_0 - aX_b) - 1/h_0) = \Delta P2 \quad (p)$$

Eventually, the following equation is derived.

$$0 \leq 12\eta q L / \delta u^3 (=\Delta P1) - \rho g H \leq (6\eta U/a) \times (1/(h_0 - aX_b) - 1/h_0) = \Delta P2 \quad (q)$$

wherein q=Q/(60×ρ×W)

In the present embodiment, the supply amount of the coating liquid is determined based on the shape of the leading end surface of the weir and the shape of the liquid discharge passage. Then, the pump is controlled by the controlling device so as to obtain the determined supply amount.

In the present embodiment, it is preferred that the clearance δu of the liquid discharge passage be in the range of from $0.1 \times 10^{-3}$ to $10 \times 10^{-3}$ [m]. The reason is that in order for the coating liquid in the reservoir to come up to the height of the leading end surface of the weir, a smaller clearance is advantageous, and thus when the clearance is excessively large, the coating liquid will not come up to the height of the leading end surface, resulting in impossibility of forming a bead.

However, when the clearance is equal to or smaller than $0.1×10^{-3}$ [m], the clearance is affected by the degree of flatness of the upper surface and lower surface of the liquid discharge passage, and it is difficult in terms of precision to keep a uniform clearance in the width direction thereof.

In the present embodiment, it is preferred that the horizontal length L1 of the leading end surface of the weir be in the range of from $1×10^{-3}$ to $30×10^{-3}$ [m], and the gradient "a" of the leading end surface of the weir be in the range of from ⅟30 to 5 (=tan θ). The reason is that the longer the horizontal length and the greater the gradient of the leading end surface of the weir, the more advantageous it is to form a bead.

Also, in the present embodiment, it is preferred that the height of the weir from the liquid discharge passage to the start point of the leading end surface be in the range of from $5×10^{-3}$ to $50×10^{-3}$ [m]. The reason is that when the weir does not have a certain height, an effect achieved by forming the reservoir is not obtained.

Figure 3:
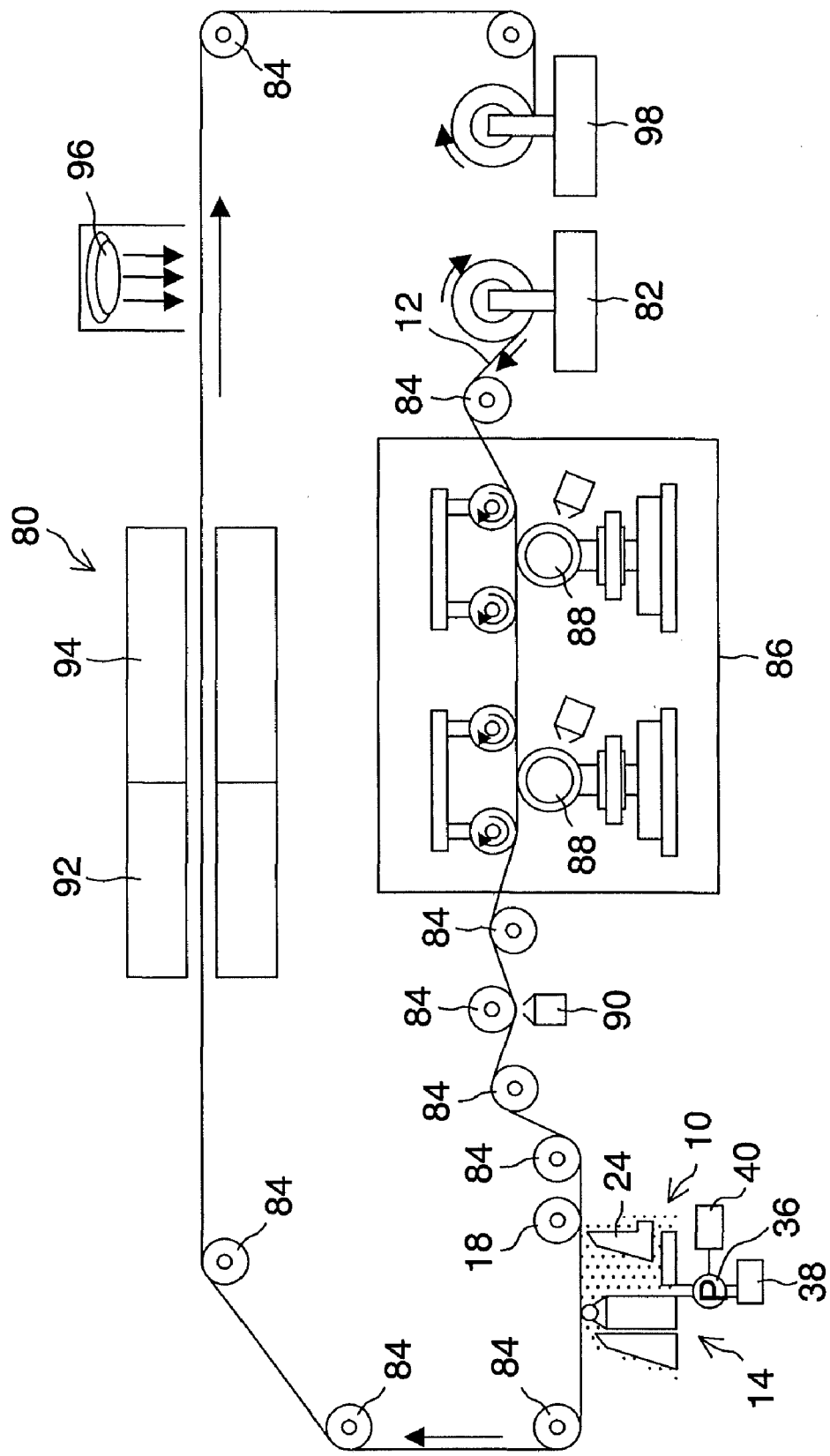
FIG. 3 is a schematic diagram showing an optical film production line into which a bar coater according to the present embodiment is incorporated.

Next, the following explains one example of the application of a bar coater 10 according to the present invention. Note that with respect to the same configurations as in the bar coater 10 illustrated in FIGS. 2A and 2B, the reference numerals that are identical to those of FIGS. 2A and 2B are designated by the same reference, and detailed descriptions may be sometimes omitted. FIG. 3 shows a production line 80 of an optical compensation film, into which the bar coater 10 according to the present embodiment is incorporated. In the optical-compensation-film production line 80, as shown in FIG. 3, a web 12, which is a transparent support, on which surface a polymer layer for forming an orientation film has been preliminarily formed, is delivered from a delivery machine 82.

Subsequently, the web 12 is guided by a guide roller 84 to be conveyed to a rubbing processing device 86, and the polymer layer of the web 12 is subjected to a rubbing process by rubbing rollers 88. On the downstream side of the rubbing rollers 88, a dust remover 90 is disposed to remove dust attached onto a surface of the web 12.

On the downstream side of the dust remover 90, a coating head 14 according to the presently disclosed subject matter is disposed. On both the upstream and downstream sides in the traveling direction of the web 12 relative to the coating head 14, there are provided guide rollers 84 for wrapping the web 12 around the bar.

A pump 36 is controlled by a controlling device 40, so that a coating liquid supplied in an excessive amount is discharged outward from the liquid discharge passage 26 without overflowing onto the weir 24. With this, the amount of the coating liquid supplied to the reservoir 30 is controlled, and it is possible to reduce distortion of dynamic contact line of the coating liquid and to prevent the occurrence of coating streaks.

The coating head 14 applies a coating liquid containing a disconematic liquid crystal onto the web 12. On the downstream side of the coating head 14, a drying zone 92 and a heating zone 94 are arranged side by side in this order, and the coating liquid applied onto the web 12 is dried and heated to form a liquid crystal layer. On the downstream side of these zones, an ultraviolet lamp 96 is further disposed, and the liquid crystal layer is exposed to ultraviolet radiation so as to crosslink the liquid crystal, thereby forming a desired polymer. With the above processes, an optical compensation film can be produced, and the optical compensation film thus produced is wound by a winding device 98.

Thus, when the bar coater 10 according to the presently disclosed subject matter is used in coating of a liquid crystal layer on an optical compensation film (coating of a coating liquid containing a disconematic liquid crystal), it is possible to produce a film having good film quality without nonuniformity, such as longitudinal streaks.

As the web 12 used in the embodiments, there are exemplified papers, plastic films, resin-coated papers, and synthetic papers. Examples of materials usable in the plastic films include polyolefins such as polyethylene, and polypropylene; vinyl polymers such as polyvinyl acetate, polyvinyl chloride, and polystyrene; polyamides such as Nylon-6,6, and Nylon-6; polyesters such as polyethylene terephthalate, and polyethylene-2,6-naphthalate; polycarbonates; cellulose acetates such as cellulose triacetate, and cellulose diacetate. Resins for use in the resin-coated papers are typified by polyolefins including polyethylene, but are not necessarily limited thereto. The thickness of the web is not also particularly limited; however, from the viewpoint of handling and general versatility, it is advantageous to use a web having a thickness of about 0.01 mm to about 1.0 mm.

A coating liquid for use in the presently disclosed subject matter is not particularly limited, and it is possible to use water or an organic solvent each containing a polymer compound; a pigment dispersion liquid, or a colloid solution, for example. In particular, preferred are coating liquids for various optical films, which are required to perform thin-layer coating with uniform thickness and very high precision, for example, coating liquids containing a liquid crystal discotic compound. Use of a coating liquid having high viscosity causes bar-stripping defects without abrading a wire-mesh or notched groove of the bar, although depending on the coated film thickness, coating speed, drying speed after coating, etc. Thus, the viscosity of the coating liquid is preferably 0.5 Pa·s or lower.

Hereinabove, preferred embodiments of a bar coater and a bar coating method according to the presently disclosed subject matter have been described, but the presently disclosed subject matter is not limited to the embodiments described above. On the contrary, the presently disclosed subject matter includes a variety of aspects, which may be combined in different ways.

EXAMPLES

Hereinafter, futures of the presently disclosed subject matter will be further specifically described, with referring to specific embodiments, which however shall not be construed as limiting the scope of the presently disclosed subject matter.

Using a bar coater 10 according to the present invention, the following were observed: a relationship between a value of $\Delta P(=\Delta P1-\rho gH)$ and a clearance $\delta u$ [m] of a liquid discharge passage each time a supply amount Q [kg/min] of a coating liquid was used; and the occurrence of coating streaks.

The following values were used except for a clearance of the liquid discharge passage in the bar coater 10 and a supply amount of the coating liquid.

Viscosity of coating liquid: 0.0012 [Pa·], supply amount of coating liquid Q: 3.0 to 10.0 [kg/min], flow rate per unit width of coating liquid flowing through liquid discharge passage: 3.915 to 13.05 [m²/s], density of coating liquid: 890 [kg/m³], length of liquid discharge passage: 0.023 [m], traveling speed of web: 0.7 [m/s], gradient of leading end surface of weir: 0.25(=tan θ), clearance between a start point of the leading end surface of the weir and the web: 0.003 [m], length of bead: 0.008 [m], height of weir from the liquid discharge passage to the start point of the leading end surface: 0.022 [m], width of liquid discharge passage: 1.435 [m].

According to the equation (n), a value ΔP2 under the conditions described above was calculated to be 13 [Pa] (ΔP2=13 [Pa]).

Figure 4:
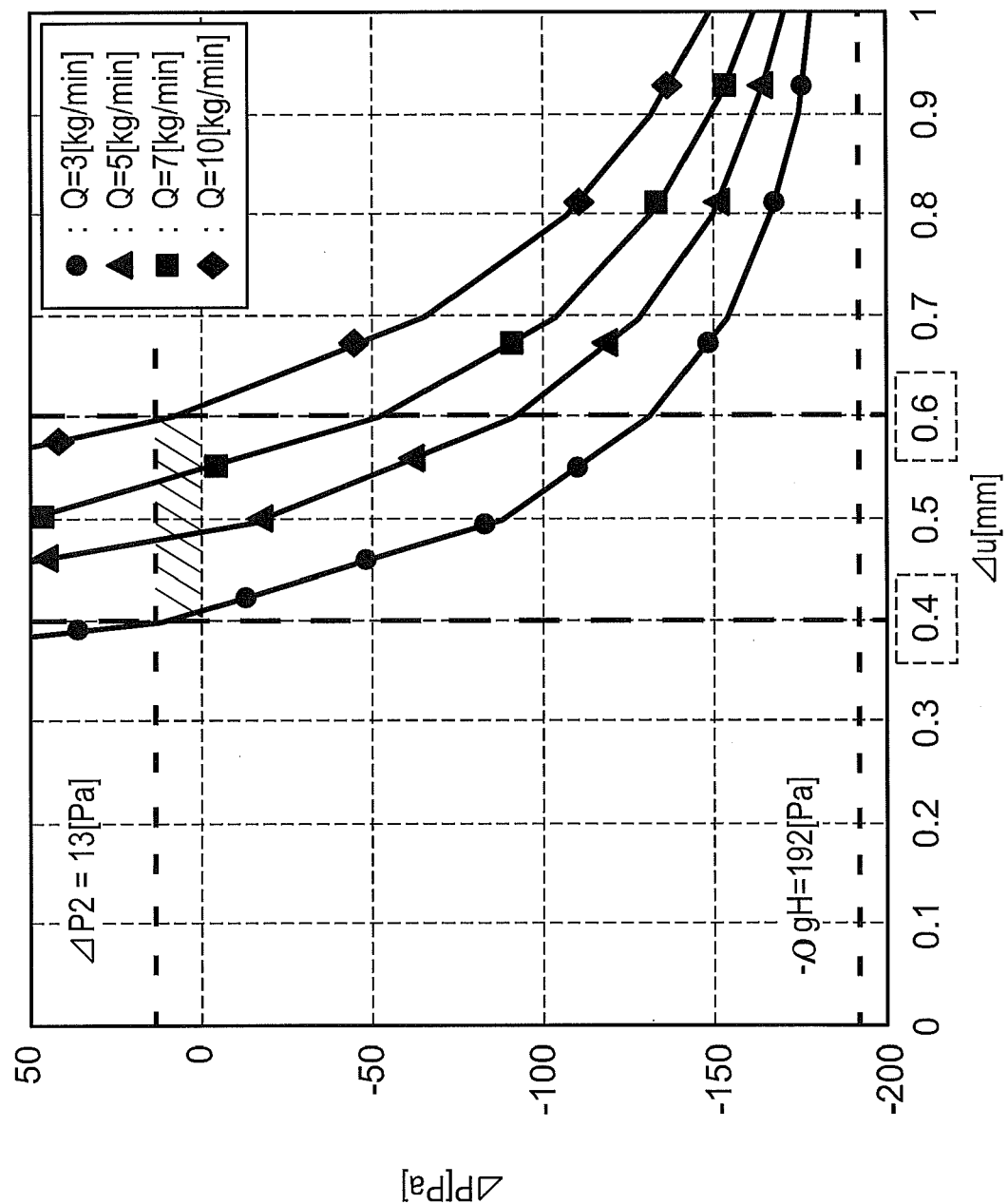
FIG. 4 is a graph showing relationship between a clearance of a liquid discharge passage and a supply amount of a coating liquid.

It is understandable from FIG. 4 that when the supply amount of the coating liquid is kept constant with the clearance of the liquid discharge passage being varied, the value ΔP considerably changes. As shown in the equation (d) $\Delta P1 = 12\eta qL/\delta u^3$, this is conceivable because a change of the clearance δu appears as the cube.

When the supply amount Q was changed from 3 to 10 [kg/min], a region (the region indicated by diagonal lines) satisfying the condition of $0 \leq \Delta P1 - \rho gH \leq \Delta P2$ was found in the range of the clearance δu being from 0.4 to 0.6 [mm]. When the resultant value was present within the region indicated by diagonal lines, coating streaks rarely occurred. It can be presumed that in the presently disclosed subject matter, when the pump is controlled so that the amount of a coating liquid supplied to the reservoir satisfies the following expressions (1) to (4), coating streaks do not occur, because an optical film can be produced with almost no distortion of dynamic contact line.

$$0 \leq \Delta P1 - \rho gH \leq \Delta P2 \tag{1}$$

$$\Delta P1 = 12\eta qL/\delta u^3 \tag{2}$$

$$\Delta P2 = (6\eta U/a) \times (1/h_0 - aX_b) - 1/h_0) \tag{3}$$

$$q = Q/(60 \times \rho \times W) \tag{4}$$

What is claimed is:

1. A bar coating method for applying a coating liquid to a traveling web, comprising the steps of:

applying a coating liquid in a reservoir onto a traveling web by rotating a bar;

forming a bead of the coating liquid in a space between the web and a leading end surface provided at a distal end portion of a weir which is arranged at the upstream side of the bar, the leading end surface having an upwardly inclined surface at an angle θ to the horizontal; and supplying the coating liquid to the reservoir and discharging the coating liquid excessively supplied to the reservoir through a liquid discharge passage, wherein an amount of the coating liquid supplied to the reservoir satisfies the following expressions (1) to (4), $$0 \leq \Delta P1 - \rho gH \leq \Delta P2 \tag{1}$$

$$\Delta P1 = 12\eta qL/\delta u^3 \tag{2}$$

$$\Delta P2 = (6\eta U/a) \times (1/h_0 - aX_b) - 1/h_0) \tag{3}$$

$$q = Q/(60 \times \rho \times W) \tag{4}$$

where η designates a viscosity [Pa·s] of the coating liquid, q designates a flow rate per unit width [m²/s] of the coating liquid flowing through the liquid discharge passage, Q designates a supply amount [kg/min] of the coating liquid, ρ designates a density [kg/m³] of the coating liquid, L designates a length [m] of the liquid discharge passage, U designates a traveling speed [m/s] of the web, "a" designates a gradient (=tan θ) of the leading end surface of the weir, h0 designates a clearance [m] between a start point of the leading end surface of the weir and the web, $X_b$ designates a length [m] of the bead, H designates a height [m] of the weir from the liquid discharge passage to the start point of the leading end surface, W designates a width [m] of the liquid discharge passage, δu designates a clearance [m] of the liquid discharge passage, and "g" designates a gravitational acceleration [m/s²].

2. The bar coating method according to claim 1, wherein the clearance of the liquid discharge passage is in the range of from $0.1 \times 10^{-3}$ to $10 \times 10^{-3}$ [m].

3. The bar coating method according to claim 1, wherein the horizontal length of the leading end surface of the weir is in the range of from $1 \times 10^{-3}$ to $30 \times 10^{-3}$ [m], and the gradient of the leading end surface of the weir is in the range of from 1/30 to 5.

4. The bar coating method according to claim 1, wherein the height of the weir from the liquid discharge passage to the start point of the leading end surface is in the range of from $5 \times 10^{-3}$ to $50 \times 10^{-3}$ [m].

* * * * *